United States Patent [19]

Miller

[11] Patent Number: 4,941,695
[45] Date of Patent: Jul. 17, 1990

[54] HATCH COVER ASSEMBLY
[75] Inventor: Roy W. Miller, Highland, Ind.
[73] Assignee: Pullman Leasing Company, Chicago, Ill.
[21] Appl. No.: 353,543
[22] Filed: May 18, 1989
[51] Int. Cl.⁵ .......................................... E05C 19/14
[52] U.S. Cl. ...................... 292/256.5; 292/DIG. 60; 292/259 R
[58] Field of Search ................... 292/257, 256.5, 247, 292/113, 259, 260, DIG. 49, DIG. 60, DIG. 31; 220/314

[56]  References Cited
U.S. PATENT DOCUMENTS

| | | | |
|---|---|---|---|
| 1,613,830 | 1/1927 | Hull | 105/377 |
| 2,551,534 | 5/1951 | Goshe | 292/113 |
| 2,901,279 | 8/1959 | MacNaught et al. | 292/256.5 |
| 2,939,734 | 6/1960 | Claud et al. | 292/247 X |
| 3,228,353 | 1/1966 | Carney, Jr. | 105/377 |
| 4,248,160 | 2/1981 | Carney, Jr. et al. | 105/377 |
| 4,388,873 | 6/1983 | Carleton et al. | 105/377 |
| 4,570,816 | 2/1986 | Ferris et al. | 220/314 |
| 4,622,902 | 11/1986 | Miller | 105/377 |
| 4,655,365 | 4/1987 | Miller | 220/314 |
| 4,690,070 | 9/1987 | Miller | 105/377 |

FOREIGN PATENT DOCUMENTS 549989 12/1922 France ................................ 292/247

Primary Examiner—Richard E. Moore
Attorney, Agent, or Firm—Richard J. Myers

[57] ABSTRACT

A hatch assembly that includes a hatch cover adapted to seal a hatch opening defined by a raised combing of a deck. A locking arm having a hinge end and a latch and extends across and beyond the hatch, and has a hatch clip adjacent each end to floatingly connected the locking arm to the hatch cover. A latch is mounted to pivot arms to engage latch engagement structure on the locking arm with a force dependent on the height of the pivot arms from the deck. An adjustment member includes tool bearing surfaces to enhance the rotation of the adjustment member and thereby adjust the force. A latch handle includes a stiffening member to strengthen the handle against forces tending to rotate the latch handle about the pivot arms. A pair of hinge bracket walls are mounted to the deck and define a hinge bracket space between them. A stop is affixed to the bracket walls to prevent the hatch cover from contacting the horizontal deck surface. The hatch clip at the hinge end of the locking bar includes a flat clip base joined to two clip side walls by respective clip arcuate portions. The clip side walls fit outwardly of a hinge member within the bracket space. Shims are located between the clip side walls and the hinge member to bias the hinge member inwardly of the clip side walls and into abutment with the flat clip base.

13 Claims, 4 Drawing Sheets

FIG. 6
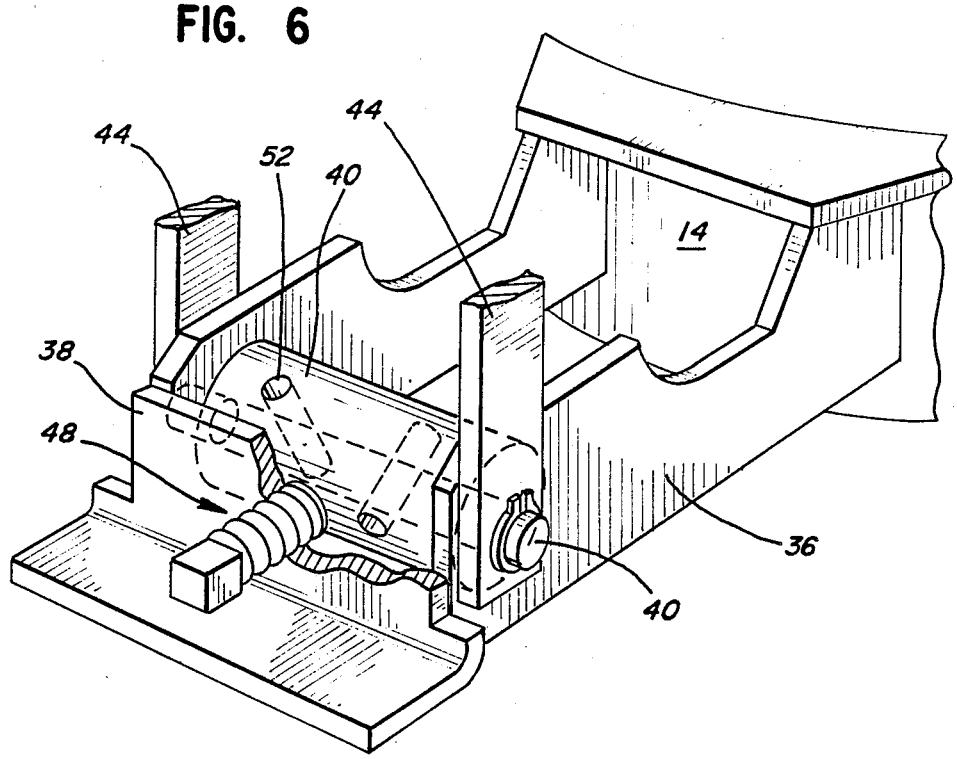
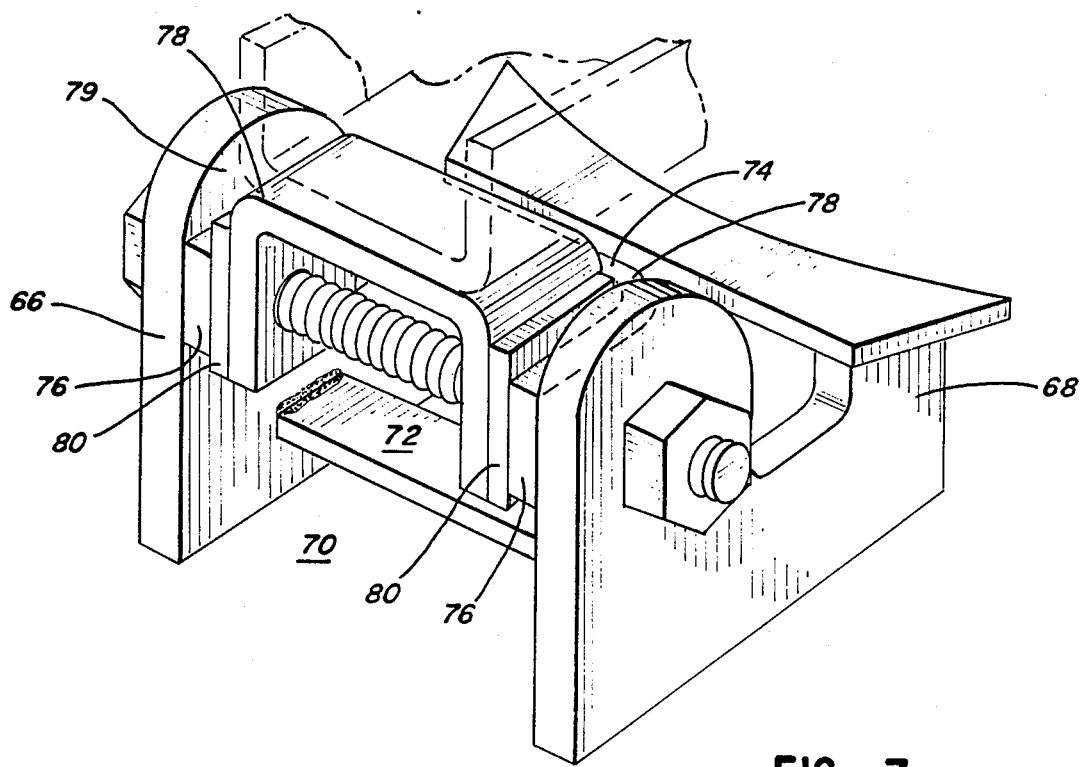
FIG. 7

HATCH COVER ASSEMBLY

BACKGROUND OF THE INVENTION

This invention relates to hatch covers for cargo carrying vessels such as the hopper of a railway covered hopper car and latch structures for such hatch covers.

Locking arrangements for lockingly sealing a hatch cover to a hatch opening defined by a combing of a vessel such as a railway covered hopper car are old and well known. The contents laded in a given vessel may have properties such that excessive pressure build up inside the vessel when the hatch is sealed. When the locking arrangement of the hatch cover is released, the excess pressure may swing the hatch cover open with considereable force potentially damaging the apparatus. To prevent this, the locking arrangement may be designed to retain the hatch cover in an intermediate "blow-off position" where the hatch cover is free to move and vent excessive pressure, but is restrained against larger movements potentially causing damage.

A number of patents have issued relating to hatch covers, among which are the following:

U.S. Pat. No. 4,690,070 issued to Roy W. Miller on Sept. 1, 1987, describing a HATCH COVER STRUCTURE to include a clip securing the hatch cover to a hold down bar.

U.S. Pat. No. 4,655,365 issued to Roy W. Miller on Apr. 7, 1987, describing a HATCH COVER LOCK to include a stop member which supports the hatch cover when the hatch cover is pivoted open.

U.S. Pat. No. 4,622,902 issued to Roy W. Miller on Nov. 18, 1986, describing a HATCH COVER AND LOCKING STRUCTURE to achieve adjustable sealing pressure.

U.S. Pat. No. 4,570,816 issued to Ferris et al. on Feb. 18, 1986, describing a HATCH COVER AND LOCKING STRUCTURE to achieve adjustable sealing pressure.

U.S. Pat. No. 4,388,873 issued to Carleton et al. on June 21, 1983, describing a RAILROAD VEHICLE to include a catch which prevents the hatch from being blown open.

U.S. Pat. No. 4,248,160 issued to Carney, Jr. on Feb. 3, 1981, describing a RAILWAY HATCH COVER AND STRAP LATCHING ASSEMBLY which includes a over center latch handle with a longitudinal stiffening member.

U.S. Pat. No. 3,228,353 issued to Carney, Jr. on Aug. 5, 1963, describing a HATCH COVER STRUCTURE FOR RAILWAYS CARS.

U.S. Pat. No. 1,613,830 issued to Hull on Jan. 11, 1927, describing a VENTILATING DOOR FOR THE HATCHWAYS OF REFRIGERATING CARS.

Despite the foregoing improvements in the manner of maintaining sealing pressure, insuring ease of rotation of the hatch and preventing damage to the latch handle and hatch were desirable.

SUMMARY OF THE INVENTION

The hatch assembly of the present invention includes a hatch cover adapted to seal a hatch opening in a deck defined by a raised combing. A locking arm having a hinge end and a latch end extends across and beyond the hatch, and has a hatch clip adjacent each end to floatingly connect the locking arm to the hatch cover. A hinge member affixed to the hinge end of the locking member is pivotally mounted to hinge bracket means on the deck to allow the hatch cover to be pivoted open or closed. A latch engagement structure at the latch end of the locking bar engages the latch structure affixed to the deck to seal the hatch. The latch structure includes a latch bracket rotatably supporting an elongate adjustment member to adjust the sealing pressure between the hatch and the hatch opening. Pivot means is eccentrically mounted from the axis of rotation of the adjustment member to the adjustment member and varies the height of the pivot means from the horizontal deck. A latch is mounted to the pivot means to engage the latch engagement structure with a force dependent on the height of the pivot means from the deck. The adjustment member includes tool bearing surfaces to enhance the rotation of the adjustment member. The latch has a latch handle extending inwardly toward the center of the hatch opening from the pivot means. The latch handle includes a stiffening member to strengthen the handle against forces tending to rotate the latch handle about the pivot means. The hinge bracket means includes a pair of hinge bracket walls mounted to the deck and defining a hinge bracket space between them. A stop means is affixed to the bracket means to prevent the hatch cover from contacting the horizontal deck surface. The hatch clip at the hinge end of the locking bar includes a flat clip base joined to two clip sidewalls by respective clip arcuate portions. The clip side walls fit outwardly of the hinge member within the bracket space. Shim are located between the clip side walls and the hinge member to bias the hinge member inwardly of the clip side walls and into abutment with the flat clip base.

BRIEF DESCRIPTION OF THE DRAWING

FIG. 6 is a perspective view of the adjustment means of the present invention with structure broken away to clearly show pivot means and locking means of the present invention.

FIG. 7 is a perspective view of the stop means and shims of the present invention.

DETAILED DESCRIPTION OF THE DRAWING

The hatch cover assembly of the present invention is an improvement to the structure disclosed in U.S. Pat. Nos. 4,690,070 and 4,655,365 to Roy W. Miller, the inventor of the present invention, which patents are assigned to the assignee of the present invention. Each is hereby incorporated by reference.

Figure 1:
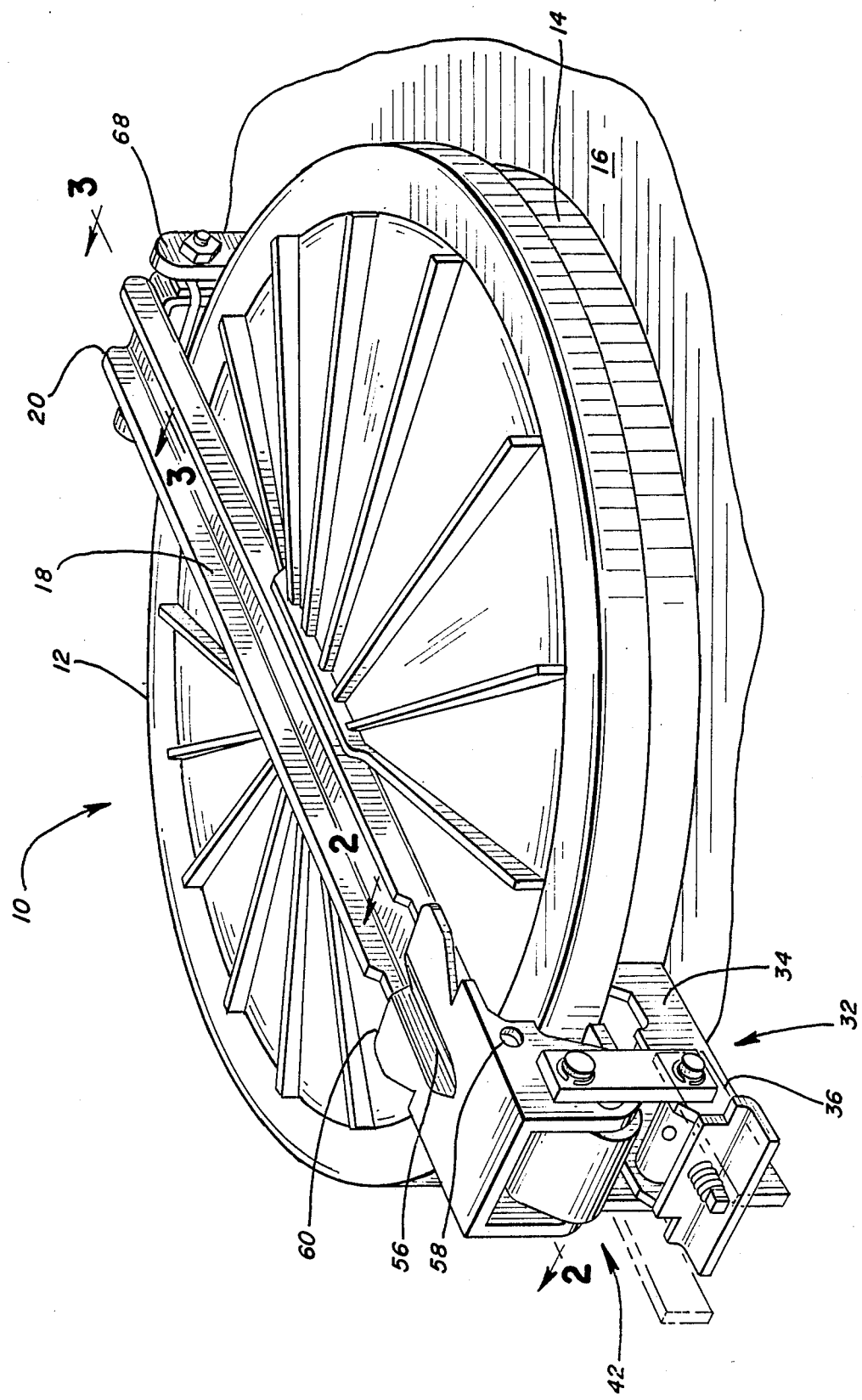
FIG. 1 is a perspective view of the hatch cover of the present invention in association with its environment.

Hatch cover assembly 10 is displayed in perspective in FIG. 1 of the drawing and includes hatch cover 12 adapted to uncover and sealingly cover a hatch opening defined by raised combing 14 which is a portion of deck 16. A locking arm 18 having a hinge end 20 and a latch end 22 extends across and beyond the hatch cover 12, and has a hatch clip 24a and 24b adjacent each end to floatingly connect the locking arm 18 to hatch cover 12. A hinge member 26, affixed to the hinge end 20 of locking arm 18, is pivotally mounted to hinge bracket means 28, on deck 16, to allow the hatch cover 12 to be pivoted open or closed. Latch engagement structure 30 at the latch end 22 of locking arm 18 engages latch structure 32, affixed to deck 16, to seal the hatch opening and act as locking means for hatch cover 12. As illustrated, hinge bracket means 28 and latch structure 32 are preferably affixed to combing 14. Additional information concerning the means of sealing the hatch opening is given in the Miller patents referenced above.

Figure 2:
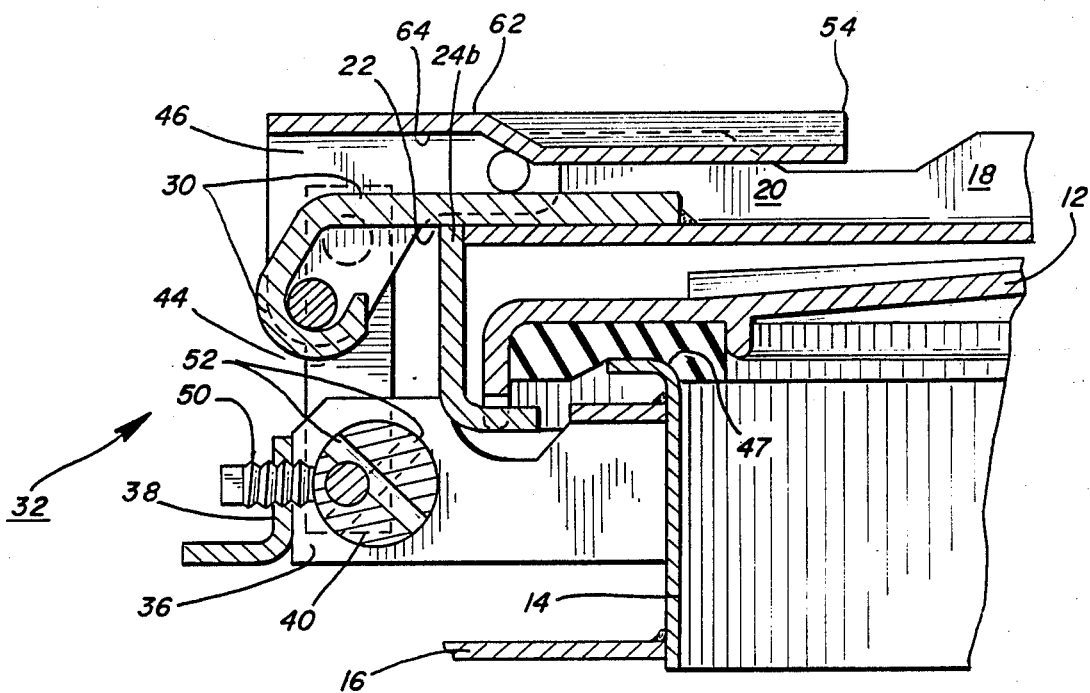
FIG. 2 is a side sectional view of the hatch cover assembly taken along the lines 2—2 of FIG. 1.
Figure 4:
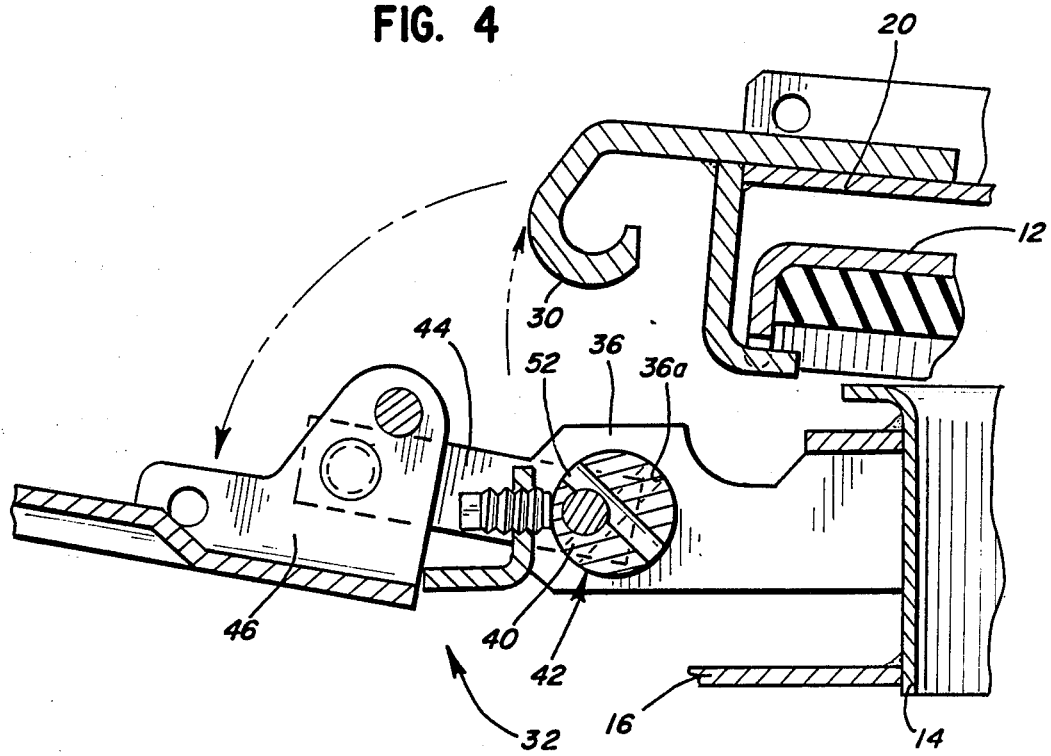
FIG. 4 is a partial sectional view of the present invention showing the locking means of the present invention.

The latch structure 32 is shown in cross section in FIGS. 2 and 4 and is shown in fragmentary perspective in FIG. 6.

Latch structure 32 includes a latch bracket 34 which has latch bracket side walls 36, affixed to combing 14. Latch bracket side walls are also connected to latch bracket end wall 38. Unless otherwise indicated, the generally preferred method of affixation, joinder, or connection of components of the invention is by welding. Latch bracket side walls 36 include member orifices 36a to rotatably support an elongate adjustment member 40. Pivot or link means 42, consisting of pivot arms 44, is pivotally mounted to adjustment member 40 eccentrically from the axis of rotation of adjustment member 40. At the opposite end of each pivot arm 44, each pivot arm 44 is pivotally mounted to latch or latch holder 46 to rotatively support latch 46. Latch 46 engages latch engagement structure 30. As may be readily appreciated in viewing FIG. 2, the sealing pressure with which hatch cover 12 compresses gasket 47 against combing 14 is dependent on the height of the pivot means 42 from the deck 16. Gasket 47 is associated with hatch cover 12 to act as sealing means. The sealing pressure may be adjusted by rotating adjustment member 40. Adjustment member 40 is selectively restrained from rotation by locking means 48 here shown as a threaded bolt 50 threaded through latch bracket end wall 38 to engage and restrain adjustment member 40 against rotation. Rotation of adjustment member 40 is enhanced by providing tool bearing surfaces or rotation means here shown as through bores 52. Preferably, through bores 52 are angularly displaced from each other by an equal amount so that a bore may receive a tool, such as a screw driver, regardless of the angular position of adjustment member 40.

Latch 46 has a latch handle 54 extending inwardly toward the center of the hatch opening from the pivot arms 44. The latch handle 54 includes a stiffening member corrugation 56 to strengthen the handle against forces tending to rotate the latch handle about the pivot means 42. Stiffening member corrugation 56 extends in full depth from about seal holes 58 to distal end 60 of latch handle 54. Seal holes 58 extend through both latch handle 54 and locking arm 18 to allow a seal to be affixed to the structure which will be altered if the hatch cover 12 is opened. It is desirable that stiffening member corrugation 56 extend for at least half the distance between pivot means 42 and distal end 60. Latch handle 54 is generally planar outside of corrugation 56 and has a thickness between top surface 62 and bottom surface 64. Preferably, stiffening member corrugation 56 is stamped into the generally planar handle 54 in a "V" shape, so that the top of the resulting vertex is slightly greater than the thickness of handle 54.

Figure 3:
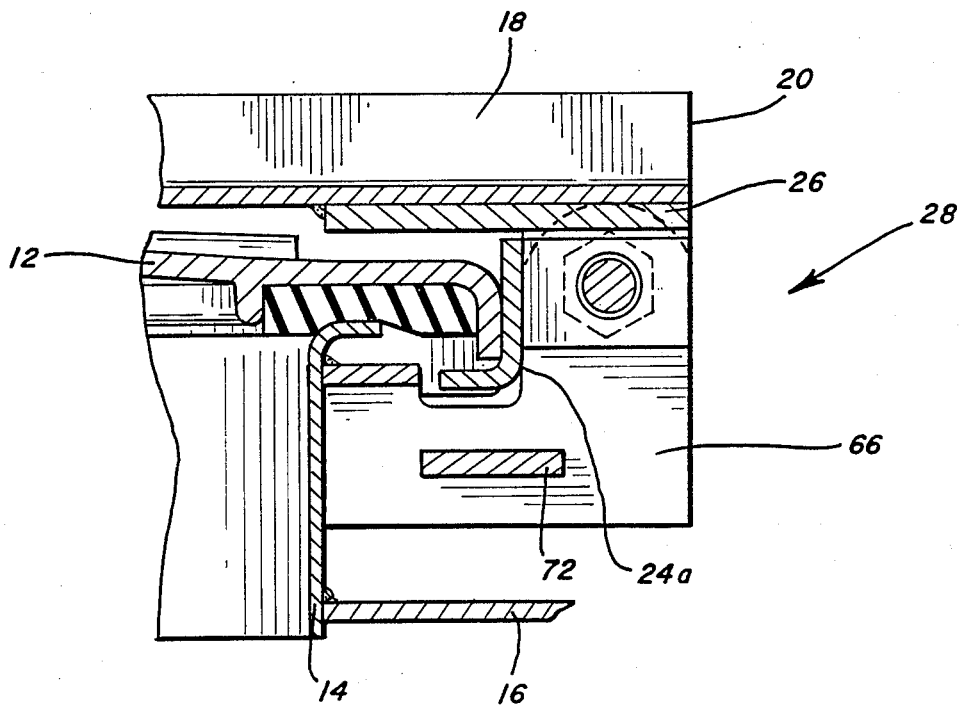
FIG. 3 is a side sectional view of a portion of the hatch cover assembly of the present invention taken along the lines 3—3 of FIG. 1.
Figure 5:
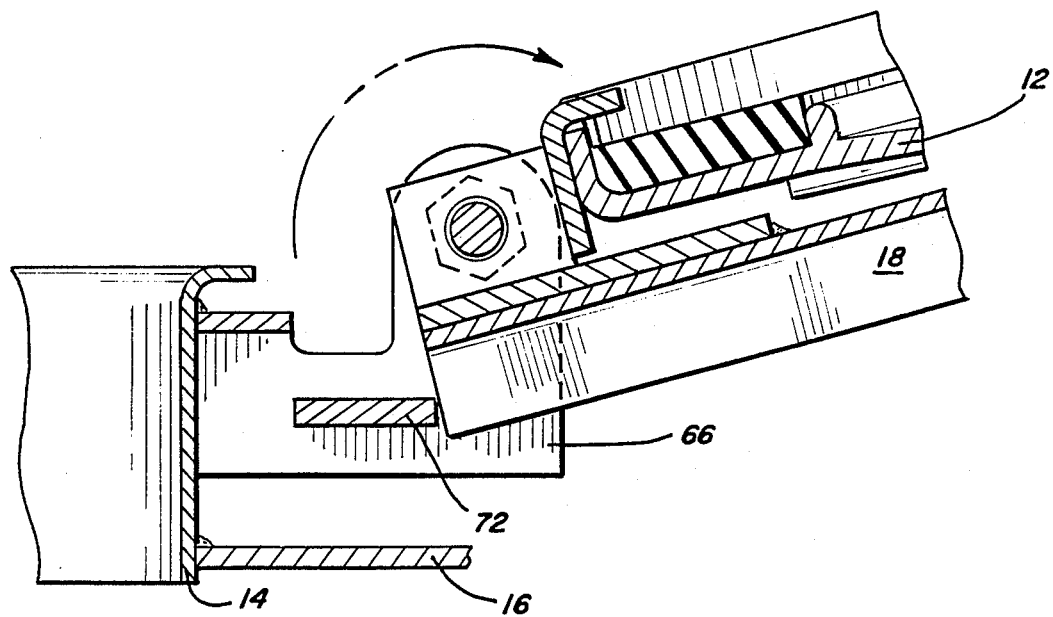
FIG. 5 is a side sectional view showing the stop means of the present invention.

The hinge bracket means 28 is shown in cross section in FIGS. 3 and 5, and in perspective in FIG. 7. Hinge bracket means 28 includes a pair of hinge bracket walls 66, 68 mounted to deck 16 and defining a hinge bracket space 70 between them. Stop means 72 is affixed to the hinge bracket walls 66, and 68 to prevent the hatch cover 12 from contacting the horizontal deck surface. As shown in FIG. 5, stop means 72 abuts an end portion of locking arm 18, as hatch cover 12, is opened to limit its rotation.

Hatch clip 24A at the hinge end 20 of the locking bar 18 includes a flat clip base 74 joined to two clip sidewalls 76 by respective clip arcuate portions 78. The clip side walls 76 fit outwardly of the hinge member 26 within bracket space 70. Shims 80 are located between clip side walls 76 and hinge member 26 to bias the hinge member 26 inwardly of clip sidewalls 76 and clip arcuate portions 78. The thickness of shims 80 is approximately equal to the distance between clip base 74 and clip sidewalls 76 to bring hinge member 26 into abutment with the flat clip base 74 and avoid cocking clip 26A with respect to hinge bracket means 28 or hinge member 26.

From the foregoing description, it will be apparent that modifications can be made to the hatch cover assembly of the present invention without departing from the teachings of the invention. Also, it will be appreciated that the invention has a number of advantages, some of which have been described above and others of which are inherent in the invention.

What is claimed is:

1. In a lading container having a deck means defining a hatch opening, a hatch cover arrangement comprising:

a hatch cover adapted to cover the hatch opening and to act on an associated sealing means around the hatch opening, the hatch cover being pivotable toward and away from the hatch opening;

a latch engagement structure connected with the hatch cover;

a latch structure connected with the deck means and adapted to engage with the latch engagement structure for securing the hatch cover over the hatch opening;

the latch structure including a latch bracket member fixedly connected with the deck means and having a latch bracket aperture therein;

an elongate adjustment member supported in the latch bracket aperture in the bracket member and rotatable therein, said adjustment member defining rotation means for providing a tool bearing surface facilitating the rotation of said adjustment member within said bracket member;

locking means selectively allowing rotation of the adjustment member in the latch bracket aperture and selectively securing the adjustment member against rotation in the latch bracket aperture in one of a plurality of rotated positions of said adjustment member;

pivot means supported by the adjustment member and spaced from the axis of rotation of the adjustment member in the latch bracket aperture, whereby rotation of the adjustment member adjusts the distance of the pivot means from the deck means; and a latch arrangement operatively associated with the pivot means and adapted to be engagable with the latch engagement structure whereby rotation of the adjustment member adjusts the tightness of the closure of the hatch cover over the hatch opening; and lateral positioning means cooperative with said locking means for maintaining said locking means in lateral adjusted position.

2. In a lading container having a deck means defining a hatch opening, a hatch cover arrangement comprising:

a hatch cover adapted to cover the hatch opening and to act on an associated sealing means around the hatch opening, the hatch cover being pivotable toward and away from the hatch opening;

a latch engagement structure connected with the hatch cover;

a latch structure connected with the deck means and adapted to engage with the latch engagement structure for securing the hatch cover over the hatch opening;

the latch structure including a latch bracket member fixedly connected with the deck means and having a latch bracket aperture therein;

an elongate adjustment member supported in the latch bracket aperture in the bracket member and rotatable therein, said adjustment member defining rotation means for providing a tool bearing surface facilitating the rotation of said adjustment member within said bracket member;

locking means selectively allowing rotation of the adjustment member in the latch bracket aperture and selectively securing the adjustment member against rotation in the latch bracket aperture in one of a plurality of rotated positions of said adjustment member;

pivot means supported by the adjustment member and spaced from the axis of rotation of the adjustment member in the latch bracket aperture, whereby rotation of the adjustment member adjusts the distance of the pivot means from the deck means; and a latch arrangement operatively associated with the pivot means and adapted to be engagable with the latch engagement structure whereby rotation of the adjustment member adjusts the tightness of the closure of the hatch cover over the hatch opening;

wherein said rotation means is at least one transverse hole.

3. The invention of claim 2 wherein the rotation means is a plurality of holes displaced from each other circumferentially by an equal amount.

4. The invention of claim 2 wherein the transverse holes are through bores in said adjustment member.

5. In a hatch cover arrangement for a lading container having a deck having a coaming means defining a hatch opening, and a hatch cover adapted to cover the hatch opening and having an arm pivotally associated with the hatch coaming so that the hatch cover is pivotable toward and away from the hatch opening, a latch arrangement comprising:

a latch engagement structure operatively associated with the hatch cover;

said latch engagement structure having a first portion operatively associated with the hatch cover and said latch engagement structure having a second portion connected with the first portion and extending generally inwardly and generally toward the center of the hatch opening from the first portion, said second portion having a contact surface portion thereon;

a latch structure comprising:

a link means operatively associated with the deck means, and a latch holder having pivot means connecting with the link means, and a generally planer handle extending inwardly of said pivot means to a distal end and including stiffening means for strengthening said handle against torquing forces tending to rotate said latch holder about said pivot means; and means for positioning said arm in a laterally adjusted position and including a bracket on the coaming and a U-shaped clip having walls fitted between the bracket and an end portion of the arm, and anti-cocking means fitted between the walls of the clip and opposing portions of said bracket.

6. The invention of claim 5 wherein said stiffening means is a corrugation extending in a direction parallel to a line between said distal end and said pivot means.

7. The invention of claim 6 wherein said corrugation extends for at least a length which is approximately one-half the distance between said distal end and said pivot means.

8. The invention of claim 7 wherein said generally planer handle is a plate having a plate thickness between a plate top surface and a plate bottom surface;

and said corrugation has a generally V-shaped cross section and a top surface of the vertex of the V is displaced from the bottom surface of said plate a distance slightly greater than the plate thickness.

9. The invention of claim 8 wherein the corrugation extends to the distal end of said handle.

10. The invention of claim 9 wherein said corrugation is displaced stock from said plate.

11. A hatch cover arrangement for a lading container having a deck means and a hatch opening in said deck means, the hatch cover arrangement comprising:

a hatch cover adapted to cover the hatch opening;

a bracket means ridgidly connected with the upper deck surface including a pair of separated bracket walls defining a bracket space therebetween;

a hinge member pivotally connected within the bracket space, a hatch cover retaining clip being an U-shaped channel having two parallel side walls joined to a flat clip base by a clip arcuate portion, the clip side walls being pivotally connected within the bracket space outwardly of said hinge member;

shim means interposed between each clip side wall and said hinge member to bias said hinge means inwardly of the clip arcuate portions and into abutment with the flat base;

a locking arm connected with the hinge member and connected with the hatch cover;

the bracket means having stop means affixed thereto, the stop means being adapted to abut the locking arm when the hatch cover is pivoted to a wide-open position thereby supporting the hatch cover without contact with the upper deck surface of the lading container;

the stop means being affixed to the bracket walls within said bracket space to provide an internal hinge stop arrangement;

a hook-shaped latch engagement member operatively associated with the hatch cover;

said hook-shaped latch engagement member comprising a mounting portion operatively associated with the hatch cover, a first portion connected with the mounting portion and extending generally downwardly therefrom, and a second portion connected with the first portion and extending generally laterally therefrom substantially below said mounting portion;

said second portion having a contact surface portion thereon and the contact surface portion and the mounting portion defining a space therebetween;

a latch mounting bracket fixedly associated with the deck means;

link means pivotally connected with the latch mounting bracket;

a latch holder having pivot means connecting with the link means; and a latch member on the latch holder spaced from the pivot means and adapted to engage with the contact surface portion whereby the latch holder may be rotated to seal the hatch cover over the hatch opening, and whereby when the latch holder is rotated, unsealing pressure in the lading container will cause the latch engagement member to rise and to rotate the latch holder and latch member into an extended position, retaining the hatch cover and allowing the pressure in the lading container to escape.

12. The invention of claim 11 wherein:

said hinge member is an U-shaped channel having two parallel hinge side walls defining hinge holes and a flat hinge base affixed to said locking arm;

said clip side wall defining clip holes; and said bracket means including a bracket pin extending between bracket walls and through the hinge and clip holes.

13. The invention of claim 12 wherein said shim means are two shim washers, each shim washer having a thickness approximately equal to the distance between the flat hinge base and an adjacent hinge side wall.

* * * * *